United States Patent [19]

Valenty

[11] Patent Number: 4,701,511

[45] Date of Patent: Oct. 20, 1987

[54] METHOD OF MAKING DIGLYME SOLUBLE SILOXANE-IMIDE COPOLYMERS

[75] Inventor: Vivian B. Valenty, Schenectady, N.Y.

[73] Assignee: General Electric Company, Waterford, N.Y.

[21] Appl. No.: 663,003

[22] Filed: Oct. 19, 1984

[51] Int. Cl.$^4$ ............................................. C08G 77/06
[52] U.S. Cl. ...................................... 528/26; 528/38; 524/755
[58] Field of Search ..................... 528/26, 38; 524/755

[56] References Cited

U.S. PATENT DOCUMENTS

| | | | |
|---|---|---|---|
| 3,325,450 | 6/1967 | Holub | 260/46.5 |
| 4,030,948 | 6/1977 | Berger | 148/33.3 |
| 4,140,572 | 2/1979 | Stein | 156/653 |
| 4,331,799 | 5/1982 | Holub et al. | 528/185 |
| 4,499,149 | 2/1985 | Berger | 528/26 |

OTHER PUBLICATIONS

William S. Shore, "Synthesis of Imide-Siloxane and Amide Siloxane Copolymers", May 1973, pp. 4–6, National Technical Information Service, U.S. Dept. of Commerce.

S. Maudgal et al., Preparation and Characterization of Siloxane-Containing Thermoplastic Polyimides", Apr. 1984, pp. 87–91, Int. J. Adhesion & Adhesives, vol. 4, No. 2.

Primary Examiner—Melvyn I. Marquis
Attorney, Agent, or Firm—G. L. Loser; J. W. Harbour

[57] ABSTRACT

There is provided a process for making diglyme soluble siloxane-imide copolymers consisting essentially of (a) heating a mixture of diglyme, azeotropic solvent, organic diamine and bis-aminoalkyl-terminated polydiorganosiloxane to reflux and (b) adding to the refluxing mixture of (a) an organic dianhydride of the formula

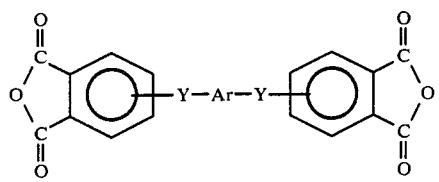

where Ar is an aromatic or aromatic containing group and Y is oxygen or sulfur. Block copolymers are obtained if the bis-aminoalkyl-terminated polydiorganosiloxane is not added to the reaction mass until after the reaction of the organic diamine and organic dianhydride has been completed.

15 Claims, No Drawings

METHOD OF MAKING DIGLYME SOLUBLE SILOXANE-IMIDE COPOLYMERS

BACKGROUND OF THE INVENTION

The present invention relates to a method for in situ preparation of siloxane-imide copolymers. More particularly, the present invention relates to a method for the direct preparation of fully imidized siloxane-imide copolymers without first having to form polyamide acid polymers.

It is known in the art that siloxane-imide copolymers can be prepared by reacting, for example, a diaminosiloxane and a dianhydride such as benzophenone dianhydride to yield a polyamic acid having the formula

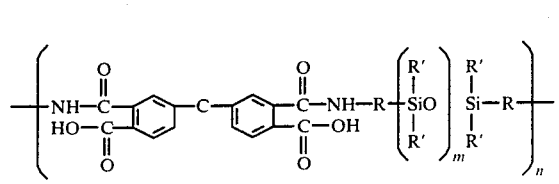

where R is a divalent hydrocarbon radical, R' is a monovalent hydrocarbon radical, m is a whole number greater than one, and n is a whole number greater than 10. Such polyamide acids are soluble in highly polar solvents such as N-methyl pyrrolidone and are provided the end-user in this form.

The silicone polymer is formed, typically after the end-user has applied a coating of polyamide acid to a substrate, by heating at a temperature of from about 150° C. to about 400° C. to remove the solvent and effect cyclization to form a siloxane-imide copolymer, having, for example, the formula

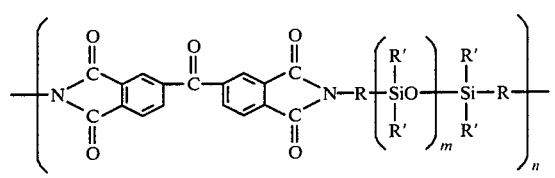

These polyimides, while useful as protective coatings for semiconductors and other electronic devices, suffer from the defect that they are insoluble in virtually all of the common organic acids. Another drawback of methods which require heating the polyamide acid at temperatures of from 150° C. to 400° C. is that many semiconductor devices cannot be heated to such extremes without adversely affecting the device itself. Furthermore, the artisan will appreciate that the amide acid can hydrolyze to form carboxylic acid groups which, of course, will prevent complete imidization when the end-user attempts to use the product. Accordingly, it is desirable to provide a polyimide capable of being applied in the form of an imide rather than in the form of an amide acid.

Holub, U.S. Pat. No. 3,325,450, discloses polyimide-siloxanes of Formula II hereinabove and their preparation by reacting diaminosiloxanes and organic dianhydrides to form a polyamide acid, and thereafter heating the polyamide acid to effect imidization. Variations of Holub's teachings can be found in U.S. Pat. Nos. 3,392,144; 3,435,002; 3,553,282; 3,558,741; 3,663,728; and 3,740,305.

Berger, U.S. Pat. No. 4,011,279, discloses a process for making polyimide-polydiorganosiloxane block copolymers which comprises effecting azeotropic water removal from a refluxing mixture of an organic dianhydride and organic diamine in the presence of an organic solvent and an effective amount of organic acid catalyst where the ratio of organic dianhydride to organic diamine has a value greater than one, allowing the mixture to cool and adding an amount of aminoalkyl terminated polydiorganosiloxane which is substantially equivalent to the excess of organic dianhydride in the previous step, agitating the resulting mixture for a time sufficient to effect polyimide-polydiorganosiloxane block copolymerization.

Berger, U.S. Pat. No. 4,030,948, discloses a polyimide copolymer which is the reaction product of a tetracarboxylic acid dianhydride, an organic diamine and a di(aminoalkyl) polysiloxane, where the di(aminoalkyl) polysiloxane constitutes 18 to 45 mole percent of the total amine requirement of the polymer.

Berger, U.S. Pat. No. 4,395,527, discloses that polyimides containing siloxane of the formula

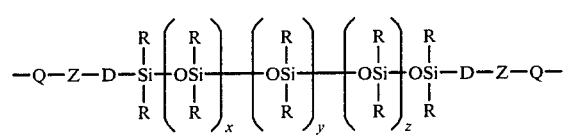

where Q is a substituted or unsubstituted aromatic group;

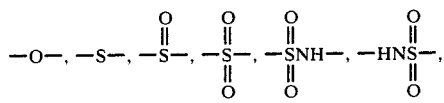

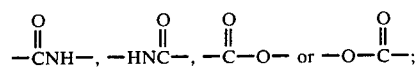

D is an unsubstituted or substituted hydrocarbylene; $R^1$, $R^2$, $R^3$, $R^4$, $R^5$, and $R^6$ are each, independently, unsubstituted or substituted hydrocarbyl radicals; and x, y and z each, independently, have a value from 0 to 100; impart improved solubility and adhesion to the polyimide. Generally, such polyimides are said to be soluble in chlorinated hydrocarbon solvents such as dichlorobenzene and trichlorobenzene, as well as in polar solvents such as N,N-dimethyl acetamide; N-methyl caprolactam; dimethylsulfoxide; N-methyl-2-pyrrolidone; tetramethylurea; pyridine; dimethylsulfone; hexamethylphosphoramide; tetramethylene sulfone; formamide; N-methylformamide; butyrolactone; and N-acetyl-2-pyrrolidone. Berger further teaches that if a diether-containing anhydride is utilized as one of the starting materials, there is obtained a polyimide soluble not only in the chlorinated hydrocarbon solvents and polar solvents previously disclosed, but also, where it contains a siloxane unit, the polyimide is soluble in a solvent which is derived from monoalkyl and/or dialkyl ethers of ethylene glycol and condensed polyethylene glycols and/or cyclic ethers containing no less than a five member ring, such as diglyme. However, Berger makes clear that polyimides will have limited solubility in diglyme. The artisan will appreciate that Berger requires the use of unusual monomers which, accordingly, are rather expensive if it is desired to obtain a diglyme soluble imide-siloxane polymer.

SUMMARY OF THE INVENTION

It is an object of the present invention to provide a method for the in situ preparation of polyimide-polysiloxane copolymers in diglyme.

It is another object of the present invention to provide a method for making siloxane-imide copolymers which eliminates the need for highly polar solvents.

It is another object of the present invention to eliminate the need for preparing polyamide acids which are heated to effect imidization only when the composition is to be used by the consumer.

Still another object of the instant invention is to eliminate the need for a catalyst in the preparation of a diglyme soluble polyimide.

In accordance with the present invention random siloxane-imide copolymers are prepared by a process consisting essentially of the steps:
(a) heating a mixture of diglyme, azeotropic solvent, organic diamine and bis-aminoalkyl-terminated polydiorganosiloxane to a reflux temperature suitable for effecting imidization; and
(b) adding to the refluxing mixture of (a) an organic dianhydride of the formula

III

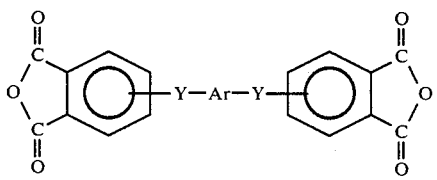

where Ar is an aromatic or aromatic-containing group and Y is oxygen or sulfur.

Block copolymers can be prepared in accordance with the present invention by leaving out of the mixture of step (a), the bis-aminoalkyl-terminated polydiorganosiloxane, and thereafter as step (c), adding it after the reaction between the organic diamine and organic dianhyride is complete. The bis-aminoalkyl-terminated polydiorganosiloxane will react with the organic dianhydride which was in excess of the amount required to consume the organic diamine.

The present invention also provides novel siloxane-imide copolymers.

DESCRIPTION OF THE INVENTION

In accordance with one aspect of the present invention there is provided a process for preparing random siloxane-imide copolymers (also referred to herein as polyimide-polysiloxane copolymers and the like) consisting essentially of the steps:
(a) heating a mixture of diglyme, azeotropic solvent, organic diamine and bis-aminoalkyl-terminated polydiorganosiloxane to a temperature suitable for effecting imidization; and
(b) adding to the refluxing mixture of (a) an organic dianhydride of the formula

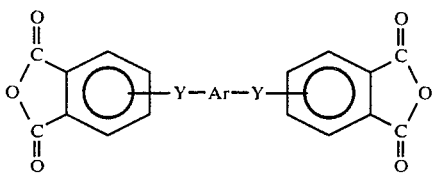

where Ar is an aromatic or aromatic-containing group and Y is oxygen or sulfur.

In another aspect of the present invention there is provided a process for preparing block siloxane-imide copolymers consisting essentially of the steps:
(a) heating a mixture of diglyme, azeotropic solvent and organic diamine to a temperature suitable for effecting imidization:
(b) adding to the heated mixture of (a) an amount of organic dianhydride of the formula

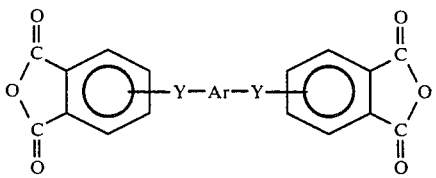

where Ar is an aromatic or aromatic containing group and Y is oxygen or sulfur, in molar excess of the amount required to react with the organic diamine; and
(c) adding to the heated mixture resulting from step (b) a bis-aminoalkyl-terminated polydiorganosiloxane in an amount approximately equivalent to the unreacted organic dianhydride.

Organic diamines which can be used in the practice of the invention are included by the formula $$NH_2—R—NH_2 \quad IV$$

where R is a radical selected from the group consisting of

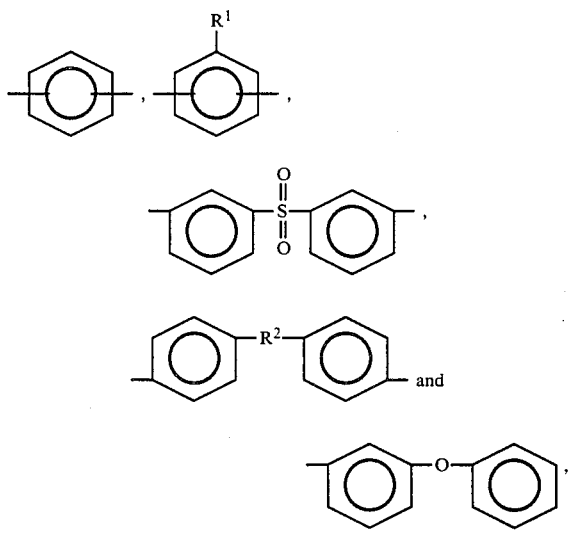

where $R^1$ is an alkyl radical having from 1 to 9 carbon atoms, preferably 1 to 3 carbon atoms and most preferably is methyl; and $R^2$ is an alkylene radical having from 1 to 4 carbon atoms, preferably 1 or 2 carbon atoms and most preferably is methylene.

The bis-aminoalkyl-terminated polydiorganosiloxanes which can be employed in the process of the present invention are included by the formula

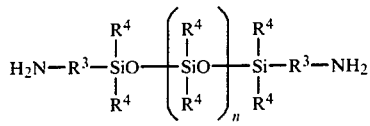

where $R^3$ is a divalent substituted or unsubstituted hydrocarbylene radical, preferably is a linear or branched alkylene radical having up to about 20 carbon atoms, and most preferably is an alkylene radical having from 1 to 5 carbon atoms; $R^4$ is an independently selected monovalent substituted or unsubstituted hydrocarbon radical, preferably a lower alkyl radical, phenyl radical, vinyl radical, 3,3,3-trifluoropropyl radical, or mixture thereof, and most preferably is methyl; and n is equal to 0 or a positive integer, preferably 0 to 100 and most preferably from 5 to 25.

The azeotropic solvent employed in the practice of the instant invention can be any solvent which is suitable for removing water formed during imidization. Xylene has been found to be particularly effective for this purpose, however, the skilled artisan can determine other suitable azeotropic solvents without undue experimentation.

Organic dianhydrides which can be employed in the practice of the present invention are included by the formula

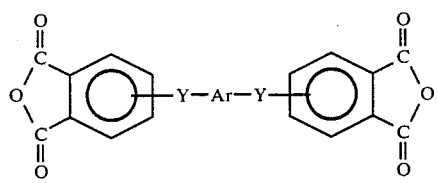

where Ar is an aromatic or aromatic-containing group and Y is oxygen or sulfur. Most preferably Y is oxygen.

Ar in the above formula can be a divalent benzene or naphthalene nucleus or a divalent group of the formula

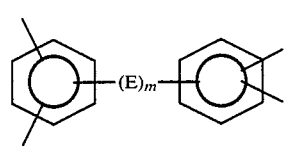

where m is 0 or 1 and E is

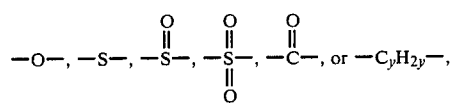

where y is an integer from 1 to 8.

In a more preferred embodiment Ar of formula III includes diether linkages so as to increase the solubility of the final product in diglyme. Thus, in the more preferred embodiment, Ar of formula III is a tetravalent residue of the formula

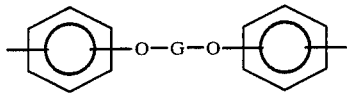

where G is phenylene or a group of the formula

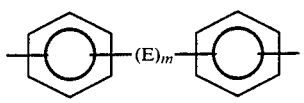

where E and m are previously defined.

Especially preferred is an Ar group in formula III having the formula

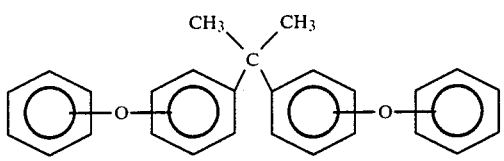

A more complete listing of suitable Ar radicals and the corresponding dianhydride reactant can be found in U.S. Pat. No. 4,395,527. It should be noted, however, that the preferred organic dianhydrides are aromatic bis(ether dianhydrides) and most preferably is bis phenol-A-dianhydride.

It will, of course, be appreciated by the artisan than mixtures of any or all of the foregoing reactants may be employed in the practice of the present invention.

In the practice of the invention polydiorganosiloxane-polyimide random copolymers can be made merely by placing the diglyme, azeotropic solvent, organic diamine and bis-alkylamino-terminated polydiorganosiloxane in a reaction vessel and thereafter heating the mixture to reflux. After the reflux temperature has been reached, the organic dianhydride is added in portions over a short period of time. Imidization occurs soon after (e.g. nearly simultaneously) condensation of the amine and anhydride takes place, thereby virtually eliminating the presence of amide acid polymer molecules. The reaction is complete after all the dianhydride has been added and the theoretical amount of water collected.

Block copolymers can be prepared in accordance with the present invention by placing the diglyme, azeotropic solvent and organic diamine in a reaction vessel and thereafter heating the mixture to reflux. A polyimide prepolymer is then prepared by effecting reaction between organic dianhydride and organic diamine, where the organic dianhydride is used in excess and which can be in the form of a mixture of two or more organic dianhydrides as previously defined. The reaction is effected in the diglyme/azeotropic solvent mixture under reflux conditions so that imidization is effected within a short time after the dianhydride is added, the resulting water being removed as a result of the azeotropic distillation. Reaction is complete when the theoretical (e.g. stoichiometric) amount of water is recovered by the azeotropic distillation.

At the completion of the polyimide prepolymer reaction, the aminoalkyl-terminated polydiorganosiloxane is added in an amount which is substantially the stoichiometric equivalent of the excess organic dianhydride added to make the polyimide prepolymer. Siloxane-imide copolymers prepared according to the present invention are particularly useful in microelectronic applications.

Alternatively, random siloxane-imide copolymers can be prepared in accordance with the present invention by heating to reflux a mixture of diglyme, azeotropic solvent and organic dianhydride. After the reflux temperature has been reached a mixture of organic diamine and bis-aminoalkyl-terminated polydiorganosiloxane is added in portions over a period of time.

Similarly, block copolymers can be prepared by heating to reflux a mixture of diglyme, azeotropic solvent and organic dianhydride. Thereafter the organic diamine is first added to the reaction mixture and, when the organic dianhydride and organic diamine have reacted to completion, the bis-aminoalkyl-terminated polydiorganosiloxane is added to react with the excess or remaining organic dianhydride. It is, or course, possible to reverse the order of addition of the diamines, however, it is preferable to first add the organic diamine.

The artisan will appreciate that in some cases it may be necessary to adjust the ratio of the reactants in order to obtain a diglyme soluble product, however, this can readily be done without undue experimentation, especially in view of the rapidity with which laboratory scale reactions proceed.

In order that those skilled in the art will be better able to practice the present invention, the following examples are given by way of illustration and not by way of limitation. All parts are by weight unless otherwise noted.

EXAMPLE 1

2.48 grams 2,4-diaminotoluene (0.020 mole) and 7.22 grams bis-aminopropyl-terminated polydimethylsiloxane having an average 8.4 $(CH_3)_2SiO$ units (0.010 mole) was added to a flask containing 50 grams diglyme and 50 grams xylene. The mixture was heated with stirring until xylene-water azeotrope began to boil over to a Dean Stark Trap. 15.6 grams bisphenol-A-dianhydride (0.030 moles) was added in small portions over 23 minutes. Heating was continued thereafter for 27 minutes to collect 1.2 ml water. The resulting random copolymer was cast on a Teflon ® die at 100°–110° C. to evaporate the solvents. The siloxane-imide copolymer was tested for tensile strength at break and elongation and found to be 5740 psi and 11 percent, respectively.

EXAMPLE 2

In order to assist the artisan in determining suitable ratios of organic diamine and bis-aminoalkyl-terminated polydiorganosiloxane, a series of experiments was conducted employing various ratios of diamines in combination with bisphenol-A-dianhydride. The results are set forth in Table I.

TABLE I

| Sample No. | Amine Composition | % $Me_2SiO$ | Diglyme Solubility |
|---|---|---|---|
| 1 | .67M.33G | 13.1 | Insoluble in hot diglyme; soluble in cold diglyme. |
| 2 | .5M.5G | 10.0 | Yes |
| 3 | .67A.33G | 7.3 | No |
| 4 | .5A.5G | 10.6 | Yes |

TABLE I-continued

| Sample No. | Amine Composition | % $Me_2SiO$ | Diglyme Solubility |
|---|---|---|---|
| 5 | .67A.33$G_{7.4}$ | 24.9 | No |
| 6 | .60A.40$G_{7.4}$ | 28.5 | Yes |
| 7 | .5A.5$G_{7.4}$ | 33.0 | Yes |
| 8 | .67T.33G | 7.2 | Yes |
| 9 | .67T.33$G_{7.4}$ | 24.6 | Yes |

Legend:

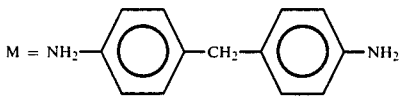

M = $NH_2$—⟨phenyl⟩—$CH_2$—⟨phenyl⟩—$NH_2$

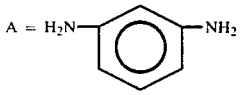

A = $H_2N$—⟨phenyl⟩—$NH_2$

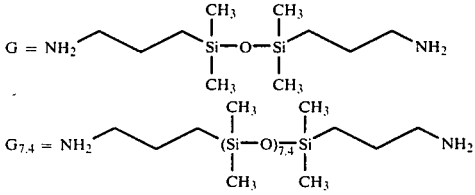

$$G = NH_2\text{—}\!\!\begin{array}{c}CH_3\\|\\Si\\|\\CH_3\end{array}\!\!\text{—O—}\!\!\begin{array}{c}CH_3\\|\\Si\\|\\CH_3\end{array}\!\!\text{—}NH_2$$

$$G_{7.4} = NH_2\text{—}(\begin{array}{c}CH_3\\|\\Si\\|\\CH_3\end{array}\!\!\text{—O})_{7.4}\begin{array}{c}CH_3\\|\\Si\\|\\CH_3\end{array}\!\!\text{—}NH_2$$

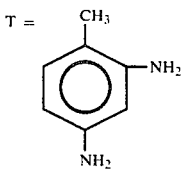

T = methyl-substituted phenylene diamine ($CH_3$, $NH_2$, $NH_2$)

I claim:

1. A process for making random siloxane-imide copolymers in situ consisting essentially of:
   (a) heating a mixture of diglyme, azeotropic solvent, organic diamine and bis-alkylamino-terminated polydiorganosiloxane to reflux, and
   (b) adding to the refluxing mixture of (a) an organic dianhydride of the formula

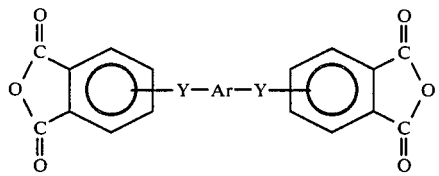

where Ar is an aromatic or aromatic containing group and Y is oxygen or sulfur.

2. A process for making block siloxane-imide copolymers in situ consisting essentially of:
   (a) heating a mixture of diglyme, azeotropic solvent and organic diamine to reflux
   (b) adding to the refluxing mixture of (a) an amount of organic dianhydride of the formula

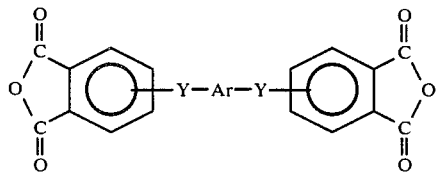

where Ar is an aromatic or aromatic-containing group Y is oxygen or sulfur, in molar excess of the amount required to react with the organic diamine, and (c) adding to the refluxing mixture resulting from (b) a bis-aminoalkyl-terminated polydiorganosiloxane in an amount approximately equivalent to the unreacted organic dianhydride.

3. The process of claim 1 or 2 wherein the organic diamine has the formula $$NH_2-R-NH_2$$

where R is a radical selected from the group consisting of

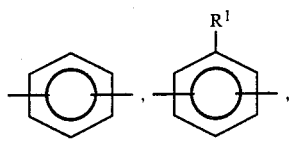,

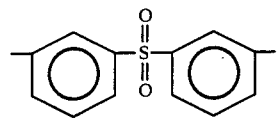,

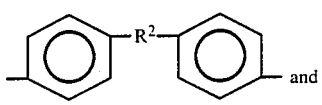 and

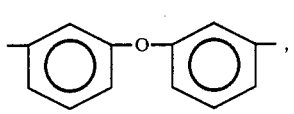, where $R^1$ is an alkyl radical having from 1 to 9 carbon atoms and $R^2$ is an alkylene radical having from 1 to 4 carbon atoms.

4. The process of claim 1 or 2 wherein $R^1$ is methyl and $R^2$ is methylene.

5. The process of claim 3 wherein the bis-aminoalkyl-terminated polydiorganosiloxane has the formula

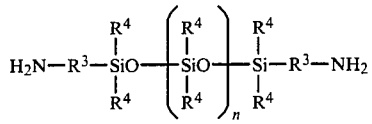

where $R^3$ is an independently selected divalent substituted or unsubstituted hydrocarbyl radical and $R^4$ is an independently selected monovalent substituted or unsubstituted hydrocarbyl radical, and n is equal to 0 or a positive integer.

6. The process of claim 5 wherein $R^3$ is an alkylene radical having from 1 to 5 carbon atoms, $R^4$ is methyl, and n is a number of from 0 to 100.

7. The process of claim 5 wherein the azeotropic solvent is xylene.

8. The process of claim 7 wherein the organic dianhydride has the formula

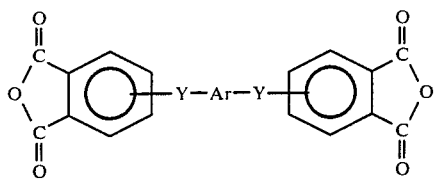

wherein Ar is an aromatic or aromatic-containing group and Y is oxygen or sulfur.

9. The process of claim 8 wherein Ar is a divalent benzene or naphthalene nucleus or a divalent group of the formula

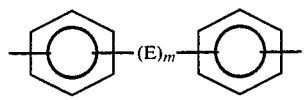

where m is 0 or 1 and E is

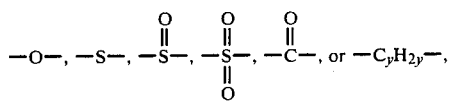

where y is an integer from 1 to 8.

10. The process of claim 8 wherein Ar is a divalent residue of the formula

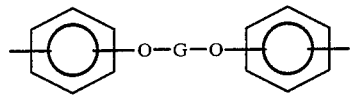

where G is phenylene or a group of the formula

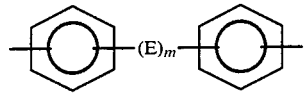

where E is

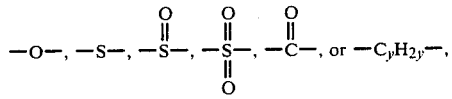

where y is an integer from 1 to 8.

11. The process of claim 8 wherein Ar is a group of the formula

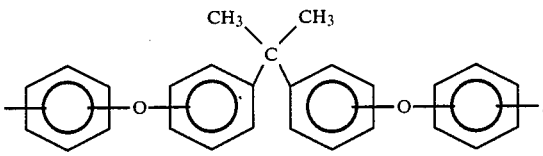

12. The process of claim 1 or 2 further comprising collecting water by azeotropic distillation.

13. The process of claim 1 or 2 wherein the reflux temperature is approximately 150° C.

14. A process for making random siloxane-imide copolymers in situ consisting essentially of:

(a) heating to reflux a mixture of diglyme, azeotropic solvent and an organic dianhydride of the formula

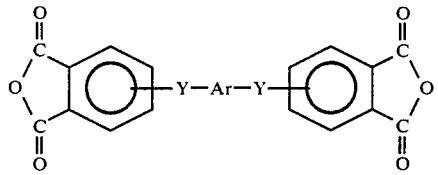

where Ar is an aromatic or aromatic-containing group and Y is oxygen or sulfur, (b) adding to the refluxing mixture of (a) a mixture of organic diamine and bis-aminoalkyl-terminated polydiorganosiloxane.

15. A process for making block siloxane-imide copolymers in situ consisting essentially of:

(a) heating to reflux a mixture of diglyme, azeotropic solvent and an organic dianhydride of the formula

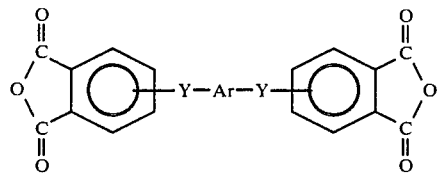

where Ar is an aromatic or aromatic-containing group and Y is oxygen or sulfur, (b) adding to the refluxing mixture of (a), either an organic diamine or a bis-aminoalkyl-terminated polydiorganosiloxane, and (c) adding to the refluxing mixture of (b), the organic diamine or bis-aminoalkyl-terminated polydiorganosiloxane not added in (b).

* * * * *